Figure 1:
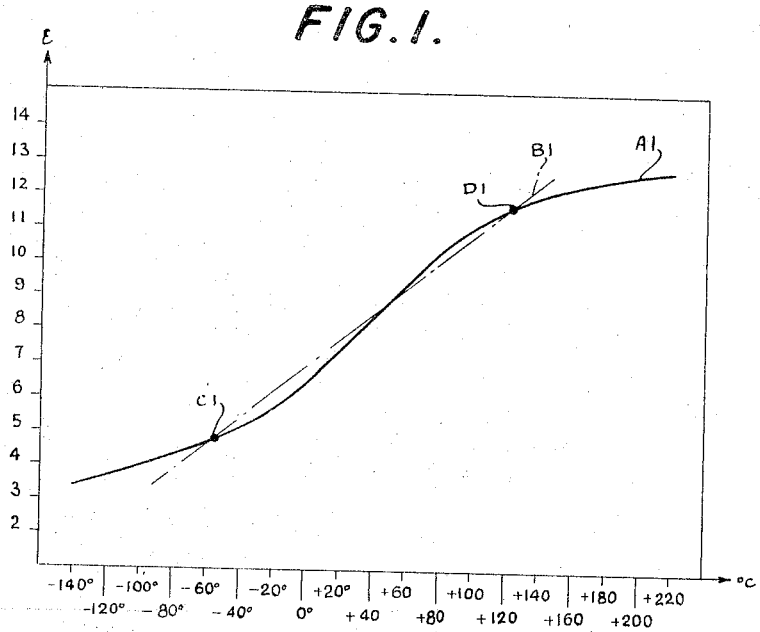

Feb. 28, 1967 M. H. PINTELL 3,307,090
ELECTRIC CAPACITOR
Filed July 7, 1965 4 Sheets-Sheet 1

INVENTOR.
MILTON H. PINTELL
BY
Karl A. Koss
ATTORNEY

Feb. 28, 1967   M. H. PINTELL   3,307,090
ELECTRIC CAPACITOR

Filed July 7, 1965   4 Sheets-Sheet 4

VINYL FLUORIDE
ALKYL VINYL ETHER
COPOLYMER
(TEMPERATURE-SENS. DIELECTRIC)

INVENTOR.
MILTON H. PINTELL
BY
ATTORNEY

United States Patent Office 3,307,090
Patented Feb. 28, 1967

3,307,090
ELECTRIC CAPACITOR
Milton H. Pintell, Bronx, N.Y., assignor to Intron International, Inc., Congers, N.Y., a corporation of New York
Filed July 7, 1965, Ser. No. 470,058
10 Claims. (Cl. 317—258)

This application is a continuation-in-part of my now abandoned but formerly copending application Ser. No. 98,357, filed Mar. 27, 1961, divided Aug. 13, 1962 (Ser. No. 226,760, now U.S. Patent No. 3,257,607).

It is known that certain solid insulators, particularly thermoplastic films, have a dielectric constant which appreciably varies with temperature so that, theoretically, it is possible to design capacitive circuit elements as temperature-responsive devices adapted to perform a switching operation under predetermined thermal conditions. An advantage of such thermosensitive capacitors over conventional thermistors is that, whereas the latter dissipate electric energy which not only is lost to its intended purpose but also is converted into heat liable to affect the response of the element, the condenser-type temperature detector is substantially nondissipative. This advantage, however, is offset in the case of known dielectrics by the lack of even approximate linearity of their thermal coefficients, at least in those temperature ranges above and below 0° C. which are of particular interest in practice.

It is, therefore, the general object of my present invention to provide a thermosensitive capacitor of the character set forth which has a nearly linear characteristic of dielectric constant versus temperature, with a distinct positive slope, in a range from well above room temperature to substantially below freezing.

A more particular object of this invention is to provide a capacitor satisfying the aforestated desiderata throughout a temperature range of −54° C. to +125° C., this being an important performance range in military specification.

A further object of this invention is to provide a highly flexible dielectric material endowed with the above-mentioned characteristics so that condensers made with such material can readily be wound into rolls or otherwise deformed to suit particular physical or electrical requirements.

As disclosed in my aforementioned application Ser. No. 98,357, a solid dielectric material of substantially linear characteristic within a range of 0° C. to +100° C. and beyond, i.e. with a substantially fixed thermal coefficient of its dielectric constant (this coefficient being the slope of the characteristic), comprises a film of partially substituted polyvinylfluoride, i.e. a polymer in which only some of the hydrogen atoms of a vinyl chain are replaced by fluorine atoms. The present invention deals more particularly with the production of compounds according to this formula and with specific compounds so produced which perform especially satisfactorily.

The film-forming compounds useful as dielectrics in a capacitor according to the invention can be defined as copolymers of vinylfluoride and an alkylvinyl ether such as methylvinyl, isobutylvinyl or cetylvinyl ether.

A characteristic feature of a copolymer useful for the aforestated purposes is that the vinylfluoride is the preponderant component, with the proportion of fluorine in the film ranging between substantially 30% and 40% by weight. Since ordinary unsubstituted polyvinylfluoride has a fluorine content of slightly above 41% by weight, the aforestated percentage range corresponds to a mixture, in the monomeric state, of about 5 to 25 parts by weight of alkylvinyl ether with 95 to 75 parts by weight of vinylfluoride.

Figure 6:
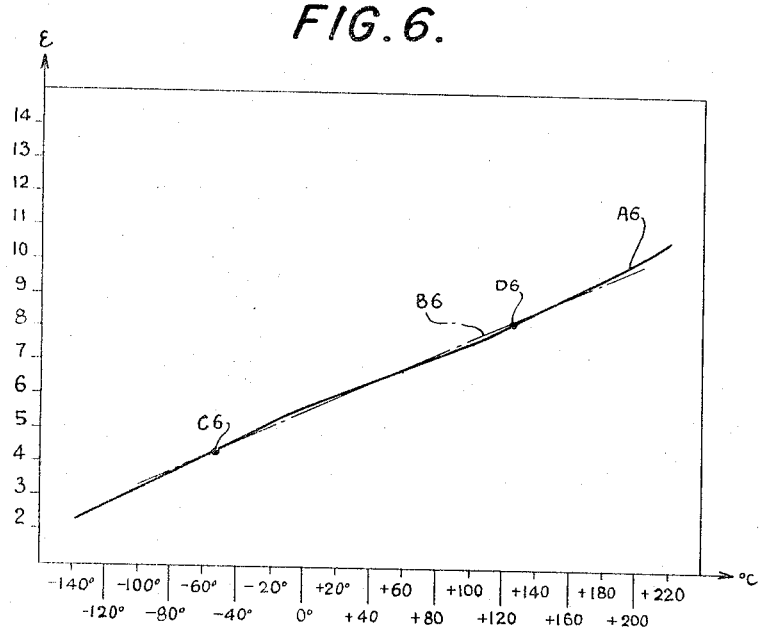
Figure 7:
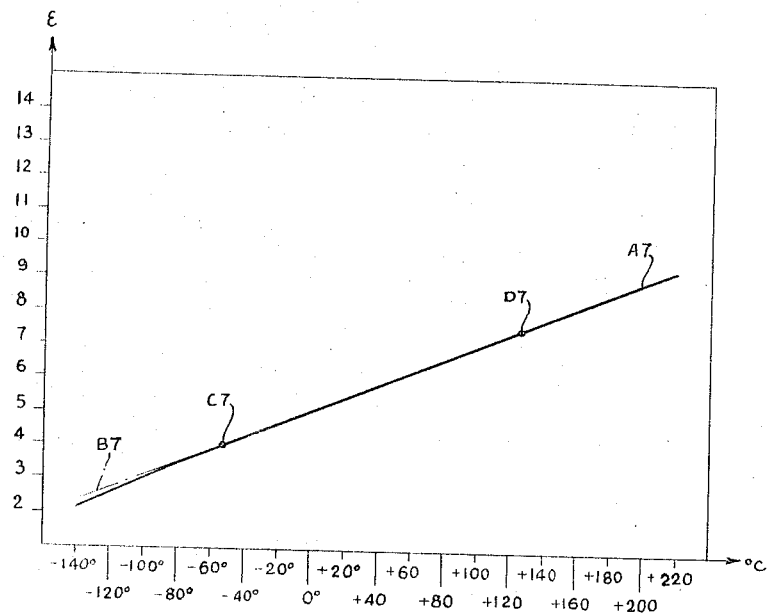
Figure 8:
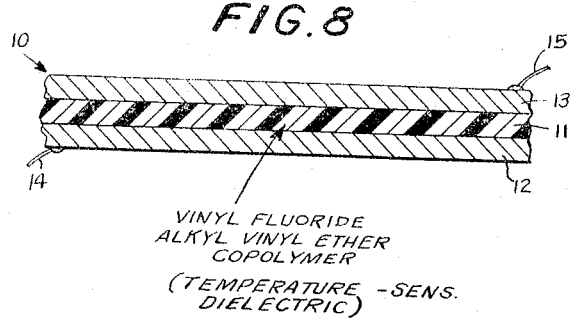

Reference will now be made to the accompanying drawing wherein FIGS. 1 to 7 are a set of graphs representing the dielectric constants of a variety of polyvinylfluoride films, plotted as a function of temperature; and FIG. 8 is a diagrammatic cross-sectional view through an electric capacitor according to this invention.

The characteristic curves of FIGS. 1–7 were all established with a constant test frequency of 1000 cycles per second, in ranges from −140° to +220° C. as indicated along the abscissa. The ordinate represents the dielectric constant $\epsilon$ of the materials involved.

FIG. 1 relates to a standard polyvinylfluoride film (commercially available under the name Teslar) with a fluorine proportion of 41.265% by weight. The characteristic $A_1$ of this film is of distinctly nonlinear shape approximating an S-curve, with a steeply sloping portion in the region of −20° to +100° C. and lesser slopes on both sides of that region. A straight line $B_1$ intersects the curve $A_1$ at points $C_1$, $D_1$ corresponding to −54° and +125° C., curve $A_1$ deviating appreciably from line $B_1$ in the range $C_1$–$D_1$ by passing first below and then above that line.

Figure 2:
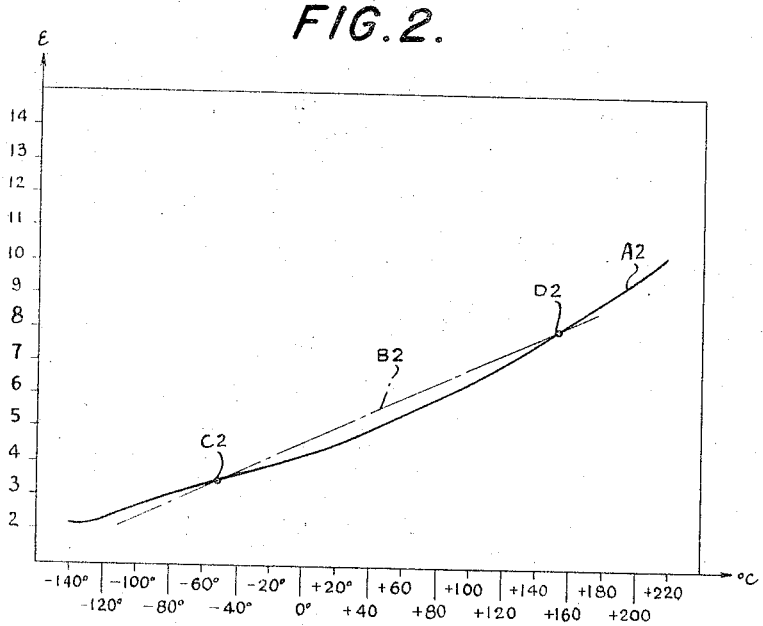

In FIG. 2 I have shown a similar characteristic $A_2$ intersected at points $C_2$ and $D_2$ by a straight line $B_2$ from which it deviates only in one sense throughout the temperature range of principal interest. It will be noted that the slope of curve $A_2$ is more nearly constant than that of curve $A_1$ and, in the upper region of that range, is considerably larger than the slope of the preceding curve. This curve $A_2$ is the characteristic of a copolymer of vinylfluoride with methylvinyl ether, the fluorine proportion being 37.20% by weight.

Figure 3:
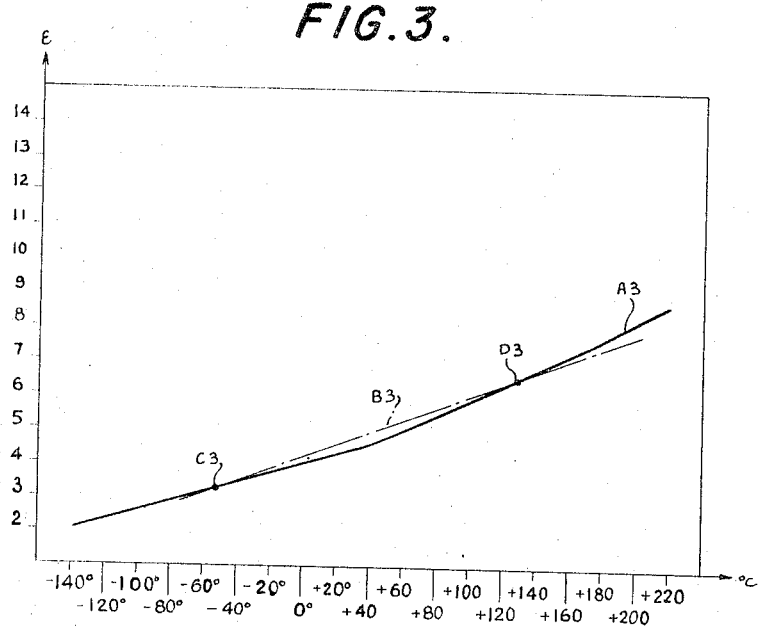
Figure 4:
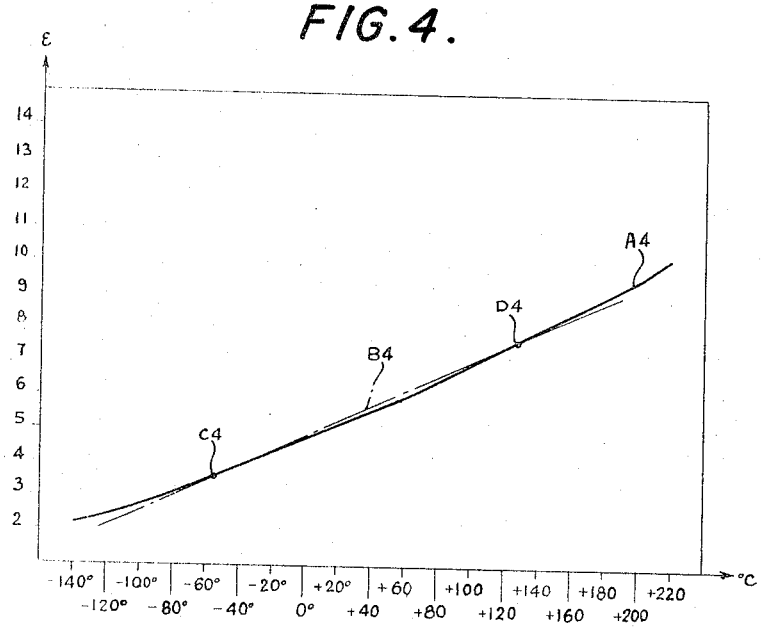

In FIG. 3 I have shown the characteristic $A_3$ of a copolymer of vinylfluoride and methylvinyl ether combined in a somewhat different ratio, with the fluorine proportion reduced to 32.89% by weight. The deviation of curve $A_3$ from straight line $B_3$, intersecting the curve at points $C_3$ and $D_3$, has been appreciably reduced on account of the increased percentage of the methylvinyl component.

Further linearization is obtained by the substitution of higher alkylvinyl ethers for the methylvinyl ether whose dielectric constant is plotted in FIGS. 2 and 3. Thus, I have shown in FIG. 4 a curve $A_4$ which closely approaches a straight line $B_4$, intersecting it at points $C_4$ and $D_4$, throughout the temperature range of −54° to +125° C.; curve $A_4$ is the characteristic of a copolymer of vinylfluoride and isobutyl ether, with the fluorine proportion amounting to 37.16% by weight.

Figure 5:
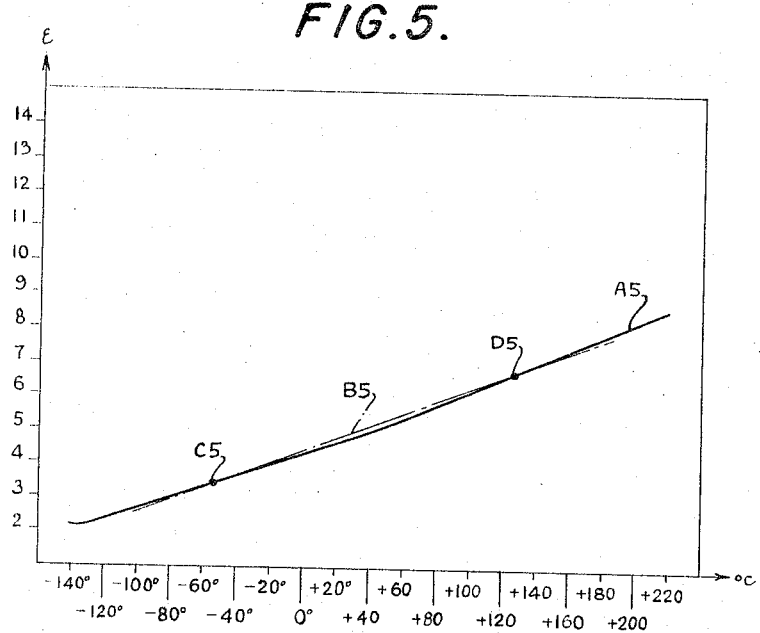

Curve $A_5$, FIG. 5, represents the same type of copolymer as curve $A_4$, except that the percentage of isobutylvinyl ether has been somewhat increased to reduce the fluorine content to 33.06% by weight. Again, the curve deviates but slightly from a straight line $B_5$ between a lower temperature limit of −54° C. (point $C_5$) and an upper temperature limit of +125° C. (point $D_5$).

Still more linear, between points $C_6$ and $D_5$, is the curve $A_6$ of FIG. 6 which represents a copolymer of vinylfluoride and cetylvinyl ether having a fluorine content of 37.14% by weight. It will be seen that curve $A_6$ remains close to a straight line $B_6$ even beyond the limits $C_6$ and $D_6$.

In FIG. 7, finally, I have shown a curve $A_7$ which throughout the range of −54° C. (point $C_7$) and +125° C. (point $D_7$), as well as beyond that range, is almost indistinguishable from a straight line $B_7$. In this instance the film consists of the same type of copolymer as that of FIG. 6, except that the percentage of cetylvinyl ether has been increased to lower the fluorine content to 33.08% by weight.

It will be apparent from the graphs of FIGS. 1–7 that the copolymers of vinylfluoride and alkylvinyl ethers as a class, are superior as thermosensitive dielectric materials to ordinary polyvinylfluoride film and that, within that class, the higher alkylvinyl ethers give better performance than the lower ones. It will also be seen that the film of FIG. 7, representing a copolymer of vinylfluoride and cetylvinyl ether with a fluorine content of about 33% by weight, is outstanding within its class by reason of the almost complete constancy of the slope of its characteristic curve, i.e. of the thermal coefficient of its dielectric constant.

While an increase in the proportion of allylvinyl ether is shown to improve the linearity of the characteristic, the slope of this characteristic (which in FIG. 7 amounts to about two units per 100° C.) increases rather rapidly with a reduction of the fluorine content to a level substantially below 30%.

The films advantageously have a thickness between substantially 0.06 and 0.08 mm., with a breakdown voltage ranging approximately from 12,000 to 16,000 volts per millimeter of thickness. They can be produced by a copolymerization process known per se, e.g. by substitution of the herein disclosed components for the reactants described in U.S. Patent No. 3,055,876.

In FIG. 8, I show a capacitor 10 whose electrodes 12 and 13 are provided with terminals 14, 15 and sandwich between them a film 11 constituted of a copolymer of vinyl fluoride and an alkylvinyl ether. Except for this film, the construction of the capacitor is conventional.

I claim:

1. An electric capacitor comprising a pair of electrodes separated by a film of a copolymer of vinylfluoride and an alkylvinyl ether, said copolymer consisting of 5 to 25 parts by weight of said alkylvinyl ether and 95 to 75 parts by weight of vinylfluoride.

2. An electric capacitor comprising a pair of electrodes separated by a film of a copolymer of vinylfluoride and an alkylvinyl ether, the proportion of fluorine in said film ranging between substantially 30% and 40% by weight of the copolymer, said copolymer consisting of 5 to 25 parts by weight of said alkylvinyl ether, and 95 to 75 parts by weight of vinylfluoride.

3. An electric capacitor comprising a pair of electrodes separated by a film of a copolymer of vinylfluoride and methylvinyl, isobutylvinyl or cetylvinyl ether, said vinylfluoride constituting between 95 and 75 parts by weight and said ether constituting between 5 and 25 parts by weight of said copolymer.

4. An electric capacitor comprising a pair of electrodes separated by a film of a copolymer of vinylfluoride and methylvinyl, isobutylvinyl or cetylvinyl ether, the proportion of fluorine in said film ranging between substantially 30% and 40% by weight of said copolymer.

5. An electric capacitor comprising a pair of electrodes separated by a film of a copolymer of vinylfluoride and cetylvinyl ether, the proportion of fluorine in said film ranging between substantially 30% and 40% by weight of said copolymer.

6. An electric capacitor comprising a pair of electrodes separated by a film of a copolymer of vinylfluoride and cetylvinyl ether, the proportion of fluorine in said film being substantially 33% by weight of said copolymer.

7. An electrical component with a progressively varying impedance in a temperature range of −54° to +125° C., comprising a condenser with a substantially linear capacitance/temperature characteristic throughout said range, said condenser including a pair of electrodes separated by a film of a copolymer of vinylfluoride and an alkylvinyl ether, said copolymer consisting of 5 to 25 parts by weight of said alkylvinyl ether and 95 to 75 parts by weight of vinylfluoride.

8. An electrical component with a progressively varying impedance in a temperature range of −54° to +125° C., comprising a condenser with a substantially linear capacitance/temperature characteristic throughout said range, said condenser including a pair of electrodes separated by a film of a copolymer of vinylfluoride and an alkylvinyl ether, the proportion of fluorine in said film ranging between substantially 30% and 40% by weight of said copolymer, said copolymer consisting of 5 to 25 parts by weight of said alkylvinyl ether and 95 to 75 parts by weight of vinylfluoride.

9. An electrical component with a progressively varying impedance in a temperature range of −54° to 125° C., comprising a condenser with a substantially linear capacitance/temperature characteristic throughout said range, said condenser including a pair of electrodes separated by a film of a copolymer of vinylfluoride and methylvinyl, isobutylvinyl or cetylvinyl ether, said vinylfluoride constituting between 95 and 75 parts by weight and said ether constituting between 5 and 25 parts by weight of said copolymer.

10. An electrical component with a progressively varying impedance in a temperature range of −54° to +125° C., comprising a condenser with a substantially linear capacitance/temperature characteristic throughout said range, said condenser including a pair of electrodes separated by a film of a copolymer of vinylfluoride and methylvinyl, isobutylvinyl or cetylvinyl ether, the proportion of fluorine in said film ranging between substantially 30% and 40% by weight of said copolymer.

References Cited by the Examiner

UNITED STATES PATENTS 2,419,010   4/1947   Coffman _____ 260—92.1

OTHER REFERENCES

Simril, V. L. et al.: The Properties of Polyvinyl Film, in Journal of Applied Polymer Science, 4 (10) pp. 67–68, 1960.

LEWIS H. MYERS, *Primary Examiner.*

E. GOLDBERG, *Assistant Examiner.*